Aug. 12, 1930.   G. R. WILLIS   1,773,020
FLOWERPOT
Filed Sept. 28, 1929
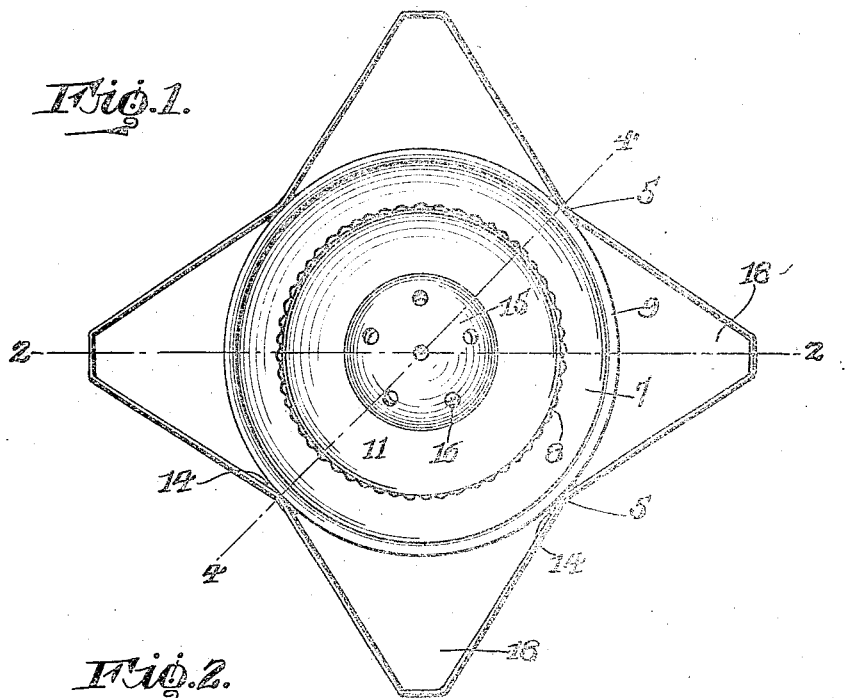
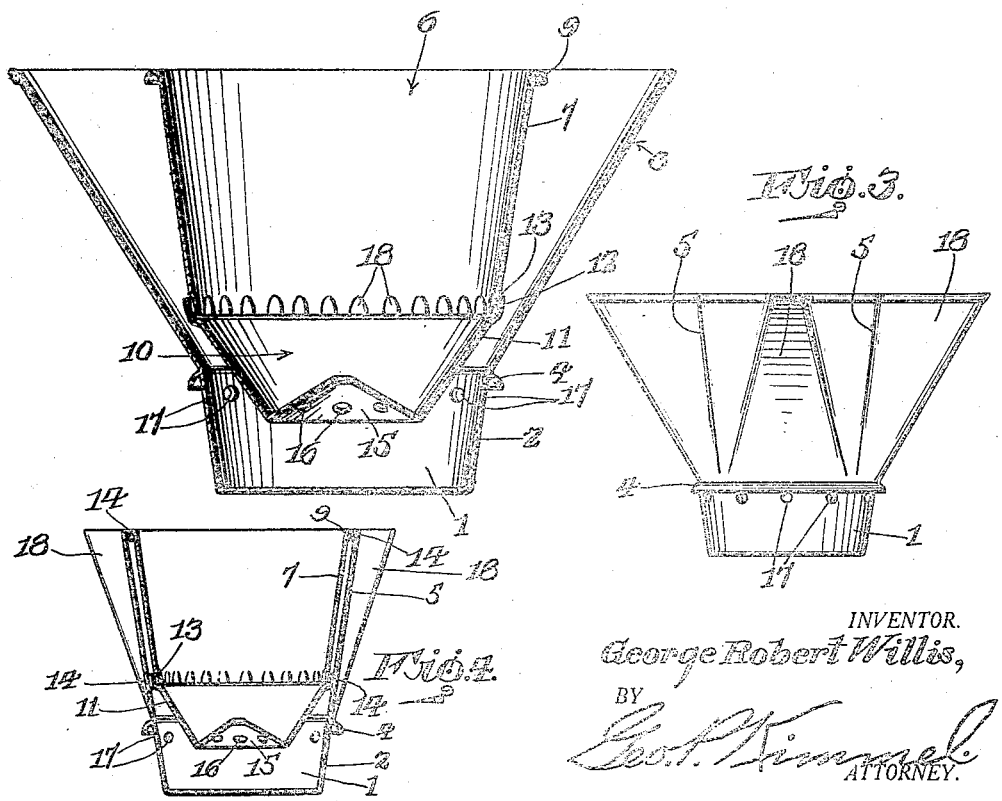
INVENTOR.
George Robert Willis,
BY
ATTORNEY.

Patented Aug. 12, 1930

1,773,020

UNITED STATES PATENT OFFICE

GEORGE R. WILLIS, OF SYRACUSE, NEW YORK

FLOWERPOT

Application filed September 28, 1929. Serial No. 395,826.

This invention relates to a flower pot and has for its primary object to provide, in a manner as hereinafter set forth, an article of such class which is adapted to catch rain and retain the same for supplying moisture to a plant carried thereby.

A further object of the invention is to provide a rain catching and retaining flower pot as aforesaid including means for preventing an oversupply of moisture to the plant in case the flower pot is exposed to exceedingly long or heavy rains.

With the foregoing and other objects in view the invention consists of the novel construction, combination and arrangement of parts as hereinafter more particularly described and as illustrated in the accompanying drawings wherein is shown an embodiment of the invention, but it is to be understood that the drawings and description are to be taken as illustrative and that the invention is intended to be limited only by the scope of the claims hereunto appended.

In the drawings wherein like reference characters designate like parts throughout the several views:—

Figure 1 is a top plan of a flower pot in accordance with this invention.

Figure 2 is a section taken on line 2—2 of Figure 1.

Figure 3 is a reduced elevation.

Figure 4 is a reduced section taken on the line 4—4 of Figure 1.

Referring to the drawing in detail, the numeral 1 indicates a basin which in the embodiments shown is formed with an annular side wall 2 slightly flaring in an upward direction. Secured to the upper edge of the side wall 2 is a combined rain catching and plant receptacle supporting element indicated generally by the numeral 3. The element 3 gradually increases in circumference from its lower to its upper edge with its lower edge conforming in size and shape with the upper edge of the side wall 2. Formed on the lower edge of the element 3 is an outwardly and downwardly extending flange 4 which overlaps a marginal portion of the side wall 2. The element 3 may be secured to the side wall 2 in any suitable manner such as by solder.

The element 3 is open at its top and bottom and is formed with a plurality of spaced, inwardly directed creases 5 extending throughout its height. Extending into the element 3 is a plant receptacle 6 which includes a body portion having a continuous wall 7 crimped adjacent its lower edge as indicated at 8 and provided at its upper edge with an outwardly curved flange 9. The wall 7 gradually increases in diameter from its lower to its upper edge and the creases 5 extend in parallel relation thereto.

The receptacle 6 further includes a bottom closure member 10 which includes a continuous, upwardly flaring side wall 11 offset adjacent its upper edge as indicated at 12. The offset portion 12 of the side wall 11 overlaps and embraces the crimped lower end portion 8 of the side wall 7 and at spaced intervals is soldered or otherwise secured thereto as indicated at 13. The offset portion 12 and flange 9 are soldered or otherwise secured to the creases 5 as indicated at 14, by which means the receptacle 6 is supported by the element 3.

The upper edge of the flaring wall 11 is disposed above the upper edge of the basin 1 while the lower portion of the wall 11 depends into the basin. The flaring wall 11 is provided at its lower edge with a conical bottom 15, the uppermost extremity of which is substantially in alignment with the upper edge of the basin. The bottom 15 is formed with a plurality of perforations 16 and the side wall 2 of the basin 1 is formed with a circumferentially extending row of spaced perforations 17 disposed above the lower edge of the flaring wall 11.

Between the creases 5 of the element 3, the latter extends at an outward and upward inclination from the receptacle 6 and provides a plurality of gutters 18 by which rainfall is collected and delivered to the interior of the basin 1. When sufficient rain has fallen to raise the level of that collected in the basin 1 to a point above the perforations 16, the collected rain will begin to pass through the perforations 16 whereby moisture will be furnished to the roots of a plant, not shown, supported in the receptacle. If the rain collected in the basin 1 rises to the height of the perforations 17, it will drain through the latter, thereby preventing the flooding of the plant.

It is thought that the many advantages of a flower pot in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. A flower pot comprising, an open top basin, a rain catching element extending upwardly from the upper edge thereof, and a plant receptacle having an imperforate side wall extending into said basin and provided with a perforated bottom, said basin being provided with a perforation above the perforations in said bottom.

2. A flower pot comprising, an open top basin, an open bottom rain catching element extending upwardly therefrom, and a plant receptacle having an imperforate side wall extending into said basin and provided with a conical perforated bottom, said basin being provided with a perforation above the lowermost extremity of said perforated bottom.

3. A flower pot comprising, an open top basin, an open bottom rain catching element extending upwardly from the upper edge thereof, and a plant receptacle supported by said element and projecting into said basin, said receptacle having a perforated bottom, said basin having a perforation located above the perforations in said bottom.

4. A flower pot comprising, an open top basin, a rain catching element extending upwardly from the upper edge thereof, and a plant receptacle supported by said element and projecting into said basin, said receptacle having an imperforate side wall and a perforated bottom, said basin having a perforation located above the perforations in said bottom, said element gradually increasing in circumference from its lower to its upper edge and conforming in size and shape at its lower edge with the upper edge of said basin.

5. A flower pot comprising, an open top basin, a rain catching element extending upwardly therefrom, and a plant receptacle supported by said element and projecting into said basin, said receptacle having a perforated bottom, said basin having a perforation located above the perforations in said bottom, said element gradually increasing in circumference from its lower to its upper edge and conforming in size and shape at its lower edge with the upper edge of said basin, said element being provided with a plurality of spaced, inwardly directed creases to which the receptacle is connected and to provide a plurality of spaced gutters for directing rain into the basin.

6. A flower pot comprising, an open top basin, an open bottom rain catching element mounted on the upper edge of the basin and formed with inwardly directed creases to provide spaced gutters for directing rain into the basin, and a plant receptacle carried by the rain catching element and extending therethrough into the basin, said plant receptacle having an imperforate side wall and a perforated bottom, said basin having its wall formed with a perforation located above the perforated bottom of the plant receptacle.

In testimony whereof, I affix my signature hereto.

GEORGE R. WILLIS.